United States Patent [19]

Kuboyama et al.

[11] Patent Number: 5,176,552
[45] Date of Patent: Jan. 5, 1993

[54] LUMINOUS FLOAT

[75] Inventors: Takeo Kuboyama, Onoda; Kenichi Shigetomi, Ube; Hideki Noda, Kitakyushu; Yasu Osaka; Yuji Osaka, both of Sayama, all of Japan

[73] Assignees: Ohumi Tsusho Kabushiki Kaisha, Tokyo; Iron Works Co., Ltd., Hiroshima, both of Japan

[21] Appl. No.: 716,983

[22] Filed: Jun. 18, 1991

[30] Foreign Application Priority Data

Sep. 25, 1990 [JP] Japan .................................. 2-100078

[51] Int. Cl.$^5$ ............................................. B63B 22/00
[52] U.S. Cl. ......................................... 441/16; 290/42
[58] Field of Search ..................................... 441/13–18; 290/42, 53

[56] References Cited

U.S. PATENT DOCUMENTS 3,898,471 8/1975 Schera, Jr. ............................. 290/42

FOREIGN PATENT DOCUMENTS 201598 9/1908 Fed. Rep. of Germany ........ 441/16
3401273 7/1985 Fed. Rep. of Germany ........ 290/53
940823 11/1963 United Kingdom .................. 290/53

Primary Examiner—Jesus D. Sotelo
Attorney, Agent, or Firm—Wenderoth, Lind & Ponack

[57] ABSTRACT

A luminous float includes a float body, a resistance plate and a light-emitting device, and causes the light-emitting device to emit light by electricity generated by a dynamo through the relative motions of the float body and the resistance plate, which are caused by waves and tidal currents. In a preferred embodiment, a contractible and extensible bellows provided at the bottom of the float body is connected with the resistance plate through a connecting element. Furthermore, one end of a spring is coupled to an inner member of the float body, and the other end of the spring is coupled to the bottom of the bellows through a coupling means.

2 Claims, 7 Drawing Sheets

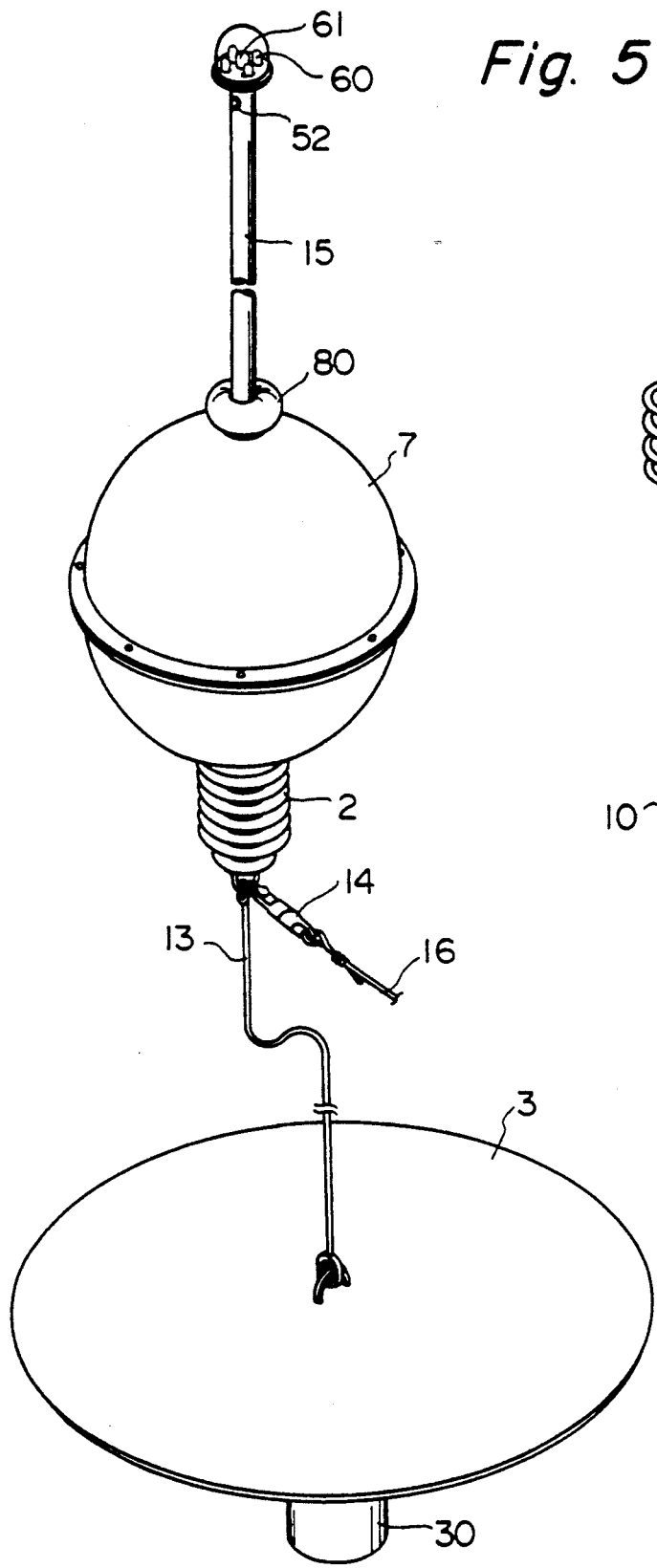
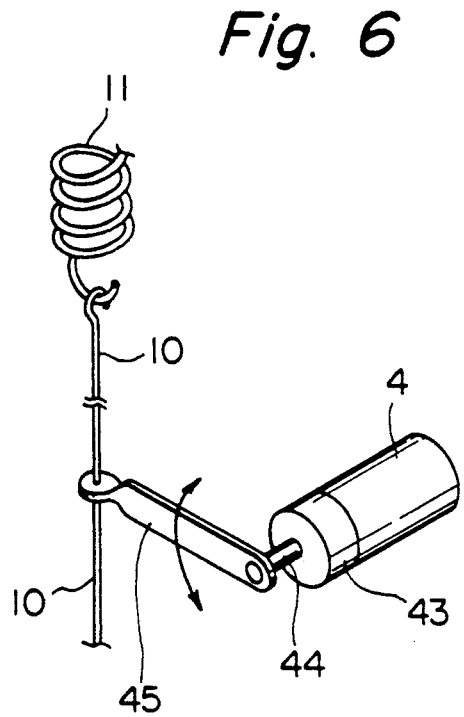
Fig. 5
Fig. 6

LUMINOUS FLOAT

FIELD OF THE INVENTION

The present invention relates to luminous floats which efficiently generate electricity for the emission of light mainly by means of utilizing waves produced on the surface of the sea and tidal currents existing under the sea and which can be utilized for fisheries, ocean construction and the like.

BACKGROUND OF THE INVENTION

Conventional luminous floats have been used as floating lights and beacon lights on the ocean. For those of small or medium size, a battery is used as a source of electricity, and those of large sizes are provided with wind-power electricity generating devices, etc.

Furthermore, luminous floats with built-in wave-power electricity generating devices which generate electricity for the emission of light by means of utilizing a vertical motion of the waves, etc., have been invented.

Luminous floats of such construction as stated above have the following serious problems.

That is, in the case of a luminous float using a battery as a source of electricity, the capacity of supplying electric power is markedly low, and since the battery becomes dead in a short period of time, the replacement of the dead battery must be frequently performed. As a matter of fact, it requires much labor involving a lot of difficulties as well as a substantial amount of financial burden.

What is further important to note is that the replaced battery is thrown away into the ocean so that the leakage of an electrolyte from the inside of the battery causes environmental contamination, which is a problem that cannot be overlooked; but, in reality, no countermeasure has been taken.

On the other hand, in the case of a luminous float capable of wind-power electricity generation, the apparatus itself is constructed on an extremely large scale and an enormous cost is required for equipment investment. Seawater containing salt and the sea breeze accelerate erosion, etc. on parts of the apparatus. Said parts must be heaved one by one for inspection for maintenance, and the number of times this heaving work is performed has been inevitably increased.

Moreover, in the case of a luminous float capable of wave-power electricity generation, what has been pointed out as a problem is that electricity cannot be generated at all when the sea is calm.

Any of the above problems is peculiar to the field of technology to which the luminous float pertains, in that the luminous float is provided on the ocean where electric power cannot be easily supplied, unlike the supply of electric power on land.

SUMMARY OF THE INVENTION

The present invention has been made for the purpose of solving all of the above problems, and it provides a truly epochal luminous float having a small-sized electricity generating device which is extremely easy to inspect for maintenance and which is capable of smoothly generating electricity even when the sea is calm. In this invention, there is no need to use a battery as a source of electricity for the luminous float, and therefore, such serious problems concerning the use of a battery as stated above would never arise.

In other words, according to the present invention, the above problems can be solved by providing a luminous float comprising: a float body; a bellows which is provided at the bottom of the float body and which is capable of contracting and extending with the inside thereof being shut off from the outside; a resistance plate; a connecting means adapted to connect the bottom of the bellows with the resistance plate; a spring of which one end is coupled to an inner member of the float body; a coupling means adapted to couple the other end of the spring to the bottom of the bellows; a dynamo having a rotation drive shaft; a motion conversion mechanism which converts reciprocation of the coupling means into a rotary motion of the rotation drive shaft of the dynamo; and a light-emitting device connected to the dynamo.

When the bellows is sunk into the sea after one end of the connecting means is connected with the bottom of the bellows, as stated above, and after the other end of the connecting means is connected with a plate-like body of any shape having a large area, the bellows comes to have the following relationship with the float body afloat on the surface of the sea.

That is, when a vertical motion of waves is imparted to the float body on the surface of a choppy sea, the plate-like body having a large area in the sea starts to act as a resistance plate and a bobbing motion of the said float body causes the bellows connected with the resistance plate to extend and contract.

On the extending and contracting motion of the bellows, the spring extends and contracts for reciprocation because of the structure which allows one end of the spring to be attached to the said float body on the inside and the other end of the spring to be connected with the bottom of the said bellows through the coupling means.

And, since there is a certain motion conversion mechanism for converting reciprocation into a rotary motion, between the above coupling means and the rotating shaft of the dynamo, the reciprocation causes the rotating shaft of the dynamo to rotate, so that electricity is generated and the light-emitting device wired to the output terminals of the dynamo can be lighted.

Next, even if the sea is calm and no force for bobbing the float body is exerted, a tidal current surely exists in the sea. Thus, the plate-like body having a large area in the sea acts as a resistance plate and is forced to move in the tidal current by a strong flow thereof. Consequently, this motion causes the bellows to extend and contract through the aid of the connecting means. At this point, the float actually remains stationary on the surface of the calm sea, and it can be considered that the float has resistance to the motion of the resistance plate.

Then, the action of the bellows produces the same effects as in the case of electricity generation by wave power as stated above.

It is evident that there may exist a situation wherein both wave power and the force of a tidal current impart energy for electricity generation by the dynamo.

The present invention further provides a luminous float comprising: a float body; a spring of which one end is coupled to an inner member of the float body; a spindle attached to the other end of the spring; a resistance plate; a connecting means adapted to connect the spindle with the resistance plate; a dynamo having a rotation drive shaft; a pinion which engages with the spindle; a one-way rotary device disposed between the pinion and the rotation drive shaft of the dynamo; and a light-emitting device connected to the output terminals of the dynamo.

This luminous float has a one-way rotary device. The action of this one-way rotary device causes the dynamo to rotate only in one direction. As a result, the load on a toothed wheel connected with the dynamo is lightened, whereby the toothed wheel can be prevented from being damaged, and moreover, the coils of the dynamo can be prevented from being damaged by overheating.

By means of employing this one-way rotary device, for example, the following structure is made possible. Namely, when the space between the float body and the resistance plate is broadened by wave power and tidal power and when the spring is caused to extend longer or contract shorter than a given reference length, rotation of the pinion is conveyed to the rotation drive shaft of the dynamo through the aid of the one-way rotary device. When the spring returns to said reference length, the one-way rotary device causes the pinion to race so that the rotation of the pinion is not conveyed to the rotation drive shaft of the dynamo. With such a structure, once electricity is generated, the spring can quickly return to the reference length for early preparation for the next electricity generation, and the amount of electricity to be generated can be increased.

On the other hand, the employment of this one-way rotary device also makes the following structure possible. Namely, when the space between the float body and the resistance plate is broadened by wave power and tidal power and when the spring is caused to extend longer or contract shorter than the reference length so that energy is stored in the spring, the one-way rotary device causes the pinion to race so that the rotation of the pinion is not conveyed to the rotation drive shaft of the dynamo. And when the spring returns to the reference length, the one-way rotary device conveys the rotation of the pinion to the rotation drive shaft of the dynamo. With such a structure, a nearly constant rotation force according to elastic force of the spring is imparted to the dynamo, and the dynamo generates a nearly constant electric power for each cycle of electricity generation. Thus, with the above structure, the dynamo can be directly connected with a lamp, without using a condenser, etc.

BRIEF DESCRIPTION OF THE DRAWINGS

FIG. 5 is a perspective view of a luminous float in accordance with the fourth embodiment.

FIG. 6 is a perspective view of an essential portion of a luminous float in accordance with the fifth embodiment.

DESCRIPTION OF THE PREFERRED EMBODIMENT

Next, embodiments of the present invention will be explained by reference to the drawings, but the present invention is not particularly confined to those embodiments.

Figure 1:
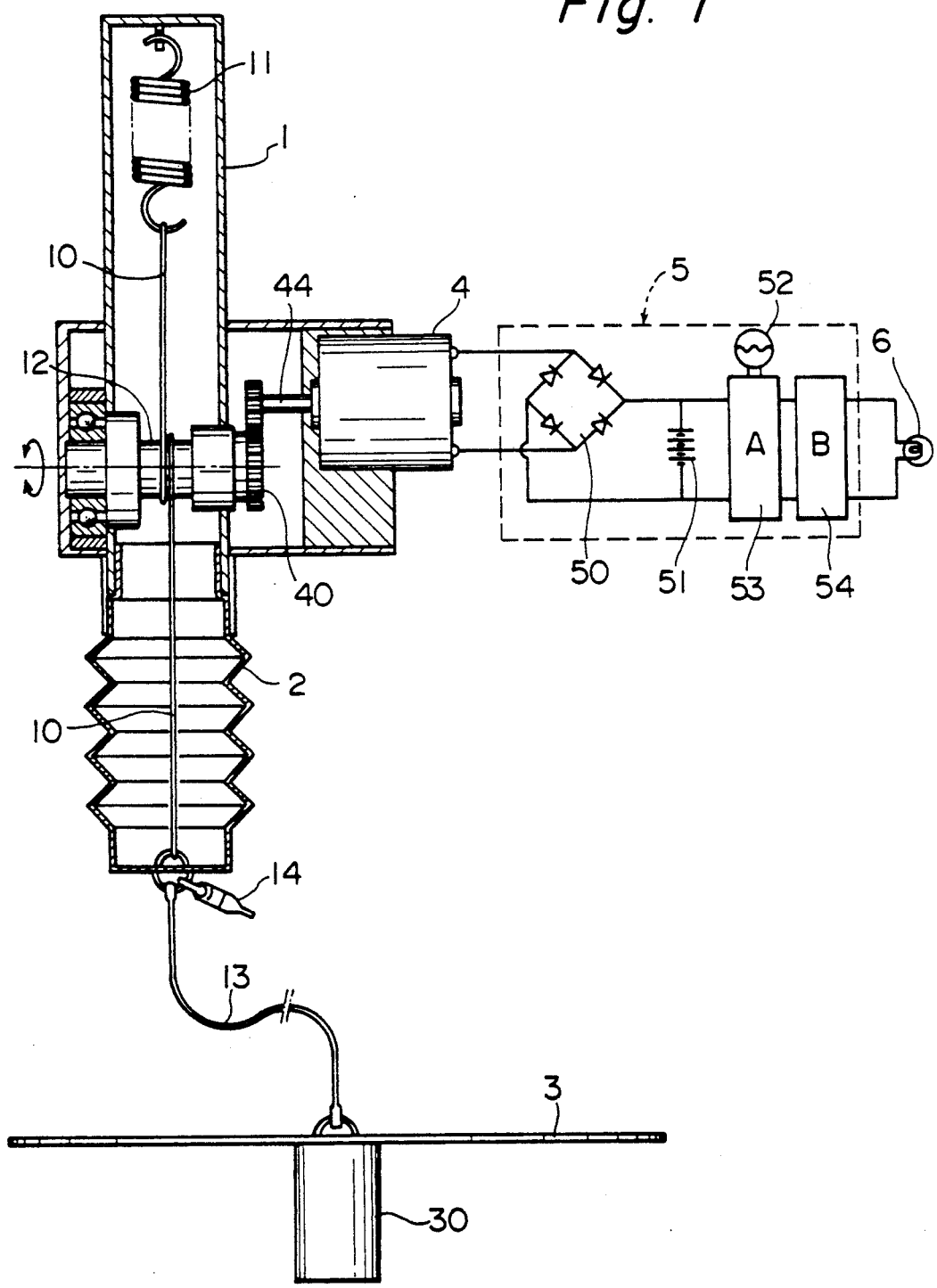
FIG. 1 is a partial sectional view of a luminous float in accordance with the first embodiment of the present invention.

FIG. 1 is a partial sectional view of the first embodiment.

Attached to the bottom of a vertical cylinder 1 provided inside a float body (not shown) is a substantially closed bellows 2 which communicates with the inside of the vertical cylinder 1. One end of a connecting means, for example, wire 13, is connected with a lower end of the bellows 2 and a connector 14 is attached to said lower end. The other end of said wire 13 is connected with a round resistance plate 3 having a large area and a heavy plumb 30 is attached to the bottom in the center of the resistance plate 3. One end of a spring 11 is attached to the ceiling of said vertical cylinder 1 from the inside, and the other end of the spring 11 is connected with the bottom of said bellows 2 through a wire 10. The wire 10 is wound a single turn on an intermediate shaft 12 connected through a gear train 40 to a rotating shaft 44 of a dynamo 4 so as to form a wound portion and a motion conversion mechanism for converting reciprocation occuring in the wire 10 into a rotary motion of the dynamo 4 through the aid of the speeding-up gear train 40. Wired to the output terminals of said dynamo 4 is a circuit portion 5 comprising a bridge circuit 50, a storage battery 51 in parallel with the output terminals of the bridge circuit 50, a switch circuit 53 having a CdS cell 52 used as a light-receiving element, and a light-emitting circuit 54 which causes two sets of Xenon lamps 6 to emit light alternately. The Xenon lamps 6 are attached to the output terminals of the circuit portion 5 so as to form a luminous float.

The above connector 14 is used in coupling the present luminous float to other floats, etc., through the aid of a wire 16 (not shown in this Figure).

The wire 10 is wound a single turn on the intermediate shaft 12. This constitutes a motion conversion mechanism which, in conjunction with the gear train 40, enables the rotating shaft 44 to smoothly rotate with the wire moving vertically in connection with the extension and contraction of the bellows 2.

The storage battery 51 is used to store surplus generated electric power and is particularly provided in the present embodiment for the purpose of easily overcoming even a very rare situation wherein electricity generation is impossible, such as in the case when not only the surface of the sea is calm but also there is no moving tidal current, and for the purpose of keeping the luminous float performing its function successfully.

The CdS cell 52 and the switch circuit 53 are provided so as to cause the Xenon lamps 6 to perform an automatic switching function which does not emit light while the environment is light and which emits light, on the other hand, when the environment gets dark (however, they do not particularly need to be provided).

Figure 2:
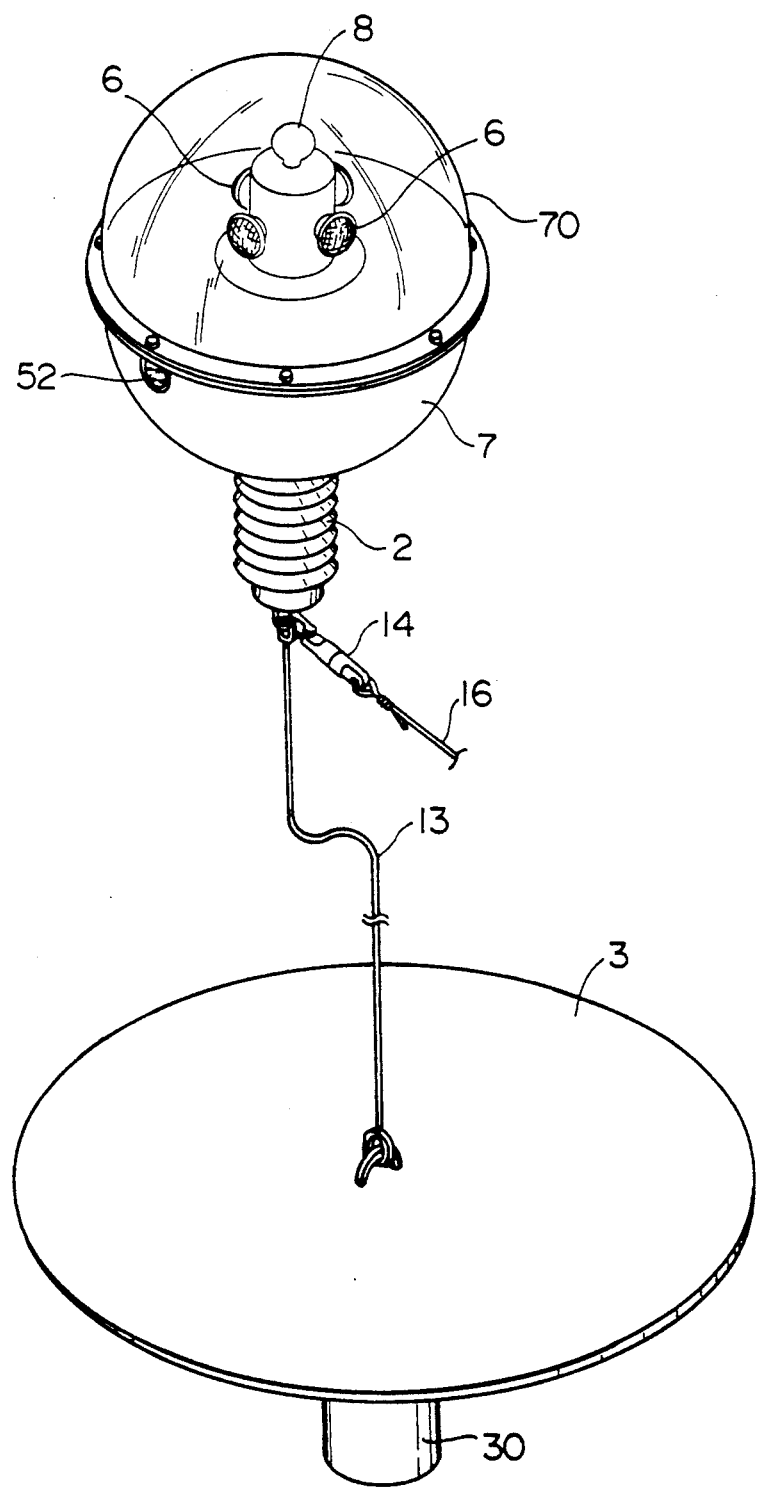
FIG. 2 is a perspective view of a luminous float in accordance with the second embodiment.

Next, FIG. 2 is a perspective view of the second embodiment of the present invention.

The basic structure of the present embodiment is nearly the same as that of the first embodiment, and a float 7 with the vertical cylinder 1 of the first embodiment fitted thereinto is constructed as follows. That is, the float is divided into an opaque lower spherical portion and a transparent upper spherical portion (a transparent cover 70). The vertical cylinder 1 supporting four Xenon lamps 6 is protrusively provided in the upper spherical portion, and a light-receiving element 52, for example, CdS cell, is attached on the lower spherical portion side.

A bellows 2 is attached to the bottom of the vertical cylinder 1 in such a manner that the inside of the vertical cylinder 1 is substantially shut off; because of this shut-off state, resistance to a contracting motion of the bellows 2 occurs and internal pressure is raised. So, in order to reduce the raised pressure, a contraction chamber 8 is formed on top of the vertical cylinder 1 (said chamber can be a rubber balloon, but any material and any structure may be chosen).

Figure 3:
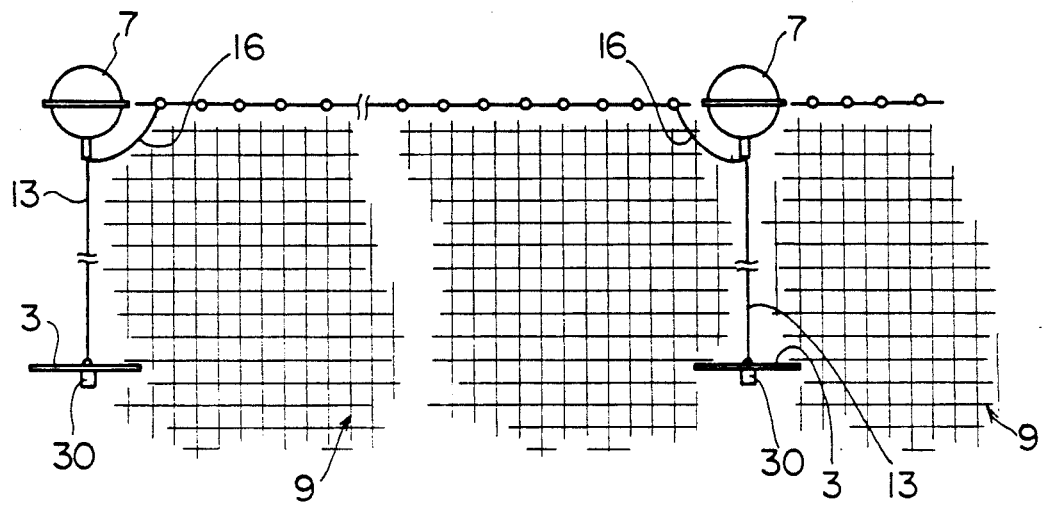
FIG. 3 is an explanatory drawing with regard to the state of the luminous float according to the second embodiment being used.

Referring to FIG. 3 to explain the purpose for which the present embodiment is used and the use state thereof, the luminous float is connected with a float for a fishing net 9 through a wire 16. Thus, the luminous float emits light to inform a ship sailing nearby that there is a fishing net 9 being stretched over here.

Figure 4:
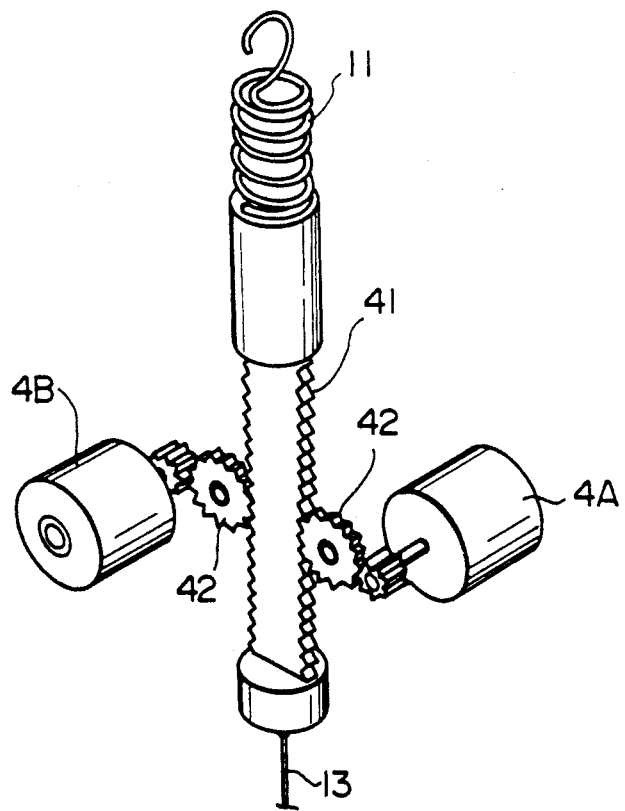
FIG. 4 is a perspective view of a luminous float in accordance with the third embodiment.
Figure 7:
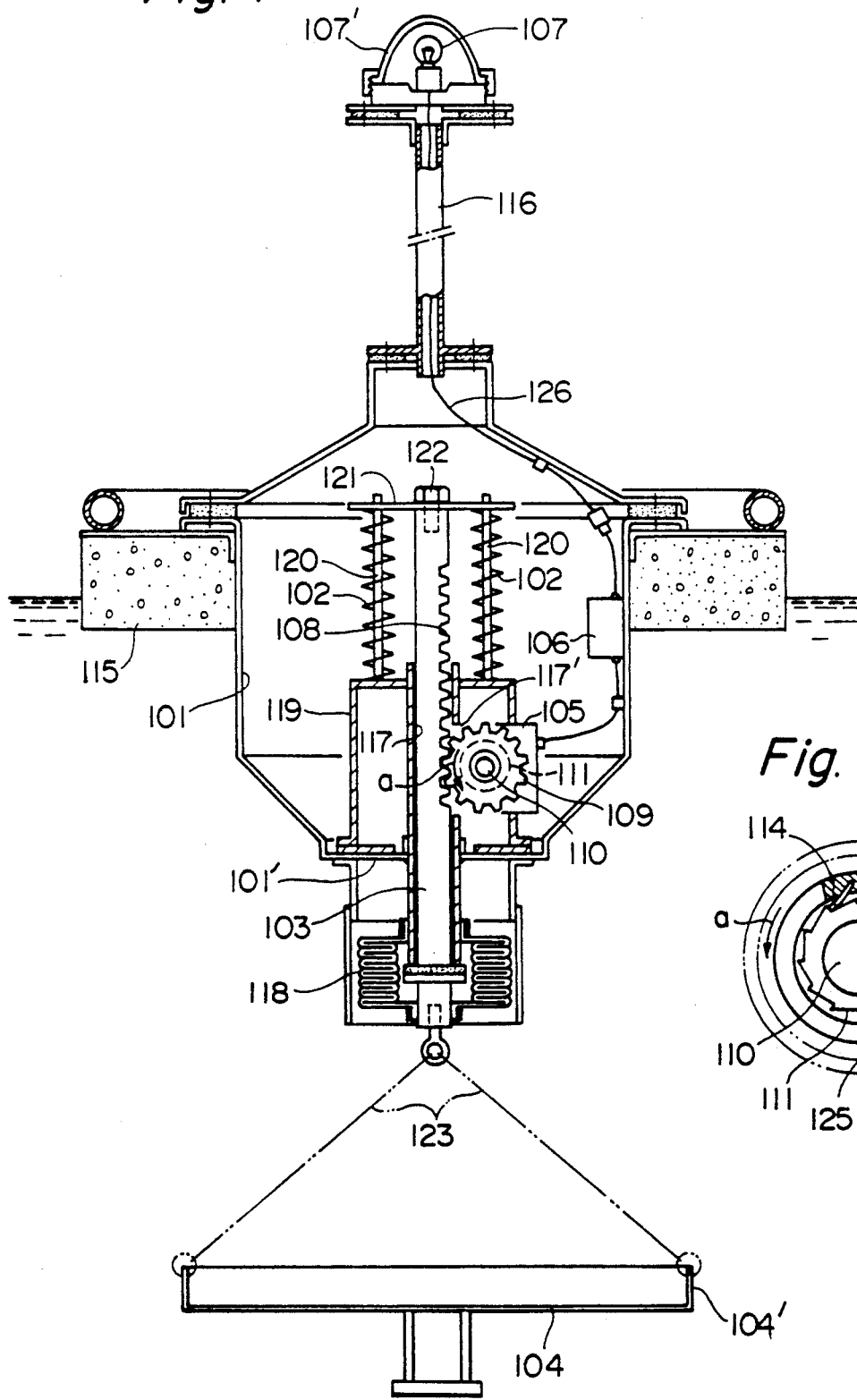
FIG. 7 is a longitudinal sectional view of a luminous float in accordance with the sixth embodiment.

FIG. 4 is a perspective view of another example of the motion conversion mechanism, as the third embodiment.

Two dynamos 4A and 4B are coupled to a vertically long rack 41 through the aid of pinions 42 which engage therewith. A spring 11 is fixed to an upper end of the rack 41, and a wire 13 is connected with a lower end thereof. The rack 41 and these pinions 42 are fitted, as a motion conversion mechanism, into the float.

As for characteristics of the motion conversion mechanism of the present embodiment, the efficiency of conversion is good since the conversion is performed through a gear train. Furthermore, it is understood that the efficiency of electricity generation is also very good since the two dynamos can be caused to simultaneously generate electricity.

Now, FIG. 5 is a perspective view of the fourth embodiment of the present invention. The present embodiment is intended as a luminous float mainly for use in ocean construction, and its basic structure is nearly the same as that of the first embodiment. A float 7 is constructed as follows.

That is, a pole 15 is provided so as to stand on top of the float 7, and an LED 60 as a light-emitting element and a reflector 61 thereof, which are both in a case, are attached to an upper end of the pole 15. Moreover, a light-receiving element 52, for example, CdS cell, is attached to the pole 15 near an under side of the above case, and a doughnut-shaped contraction chamber 80 is formed at the junction of the pole 15 and float 7.

Since the bellows 2 is attached to the bottom of the vertical cylinder 1 such that the inside of the vertical cylinder 1 is substantially shut off, this shut-off state produces resistance to a contracting motion of the bellows 2. So, the above doughnut-shaped contraction chamber 8 is formed for the purpose of reducing pressure raised inside.

FIG. 6 shows another example of the motion conversion mechanism, as the fifth embodiment. In this embodiment, one end of a vertically moving lever 45 is fixed to a midway portion of a wire 10 connected with a lower end of a spring 11, and the other end of said lever is attached to a rotating shaft 44 projecting from a speeding-up gear portion 43 of a dynamo 4. The motion conversion mechanism so constructed forms an integral part of the luminous float.

As to the basic operation of the present embodiment, a vertical motion of the vertically moving lever 45 in connection with a vertical motion of the wire 10 causes the rotating shaft 44 to rotate to generate an alternating current.

The present invention is not confined to the aforesaid embodiments alone.

For example, the bellows is not necessarily attached strictly to the bottom of the float and can be provided inside the float on condition that attachement is performed in a downward direction of the float. Furthermore, the bellows itself can be constructed so as to act as a float.

The above contraction chamber is optional.

The storage battery may be omitted, but the use of this battery enables one to cope well with troubles such as failure of an electricity generating device, etc., as well as an extremely rare situation wherein not only the sea is calm but also there is no moving tidal current.

The resistance plate allowed to move in a tidal current may have wave-shaped parts or may be provided with a fin.

Moreover, the weight, shape and attaching position of a heavy plumb can be determined at discretion, and it can also be provided inside the above resistance plate so as to be integrated therewith.

With respect to the motion conversion mechanism, a variety of structures other than the aforesaid three examples have been contrived.

Furthermore, as a light-emitting element, a lamp other than those mentioned above, an EL and the like can be selected at discretion.

As stated above, the present invention is constructed by attaching to the bottom of a float, a substantially closed bellows which communicates with the inside of the float; connecting one end of a connecting means with a lower end of the bellows; connecting the other end of the connecting means with a resistance plate of any shape having a large area; attaching a heavy plumb to the resistance plate; attaching one end of a spring to the ceiling of said float from the inside; coupling the other end of the spring to the bottom of said bellows through a coupling means; placing any motion conversion mechanism for converting reciprocation into a rotary motion, between the coupling means and a rotating shaft of a dynamo; and then wiring any light-emitting device to the output terminals of said dynamo.

Thus, the present invention has achieved the providing of a truly epochal luminous float which does not cause serious problems such as environmental pollution, etc., since a battery does not necessarily need to be used as a source of electricity, of which the light-emitting device itself is of small size and is extremely easy to inspect for maintenance, and which is capable of smoothly emitting light through electricity generation not only by wave power but also by means of utilizing a tidal current when the sea is calm.

As for one with a built-in storage battery, it is a further excellent invention which is capable of always performing its function as a luminous float by easily overcoming even a very rare situation wherein electricity generation is impossible, as in the case when not only the surface of the sea is calm but also there is no moving tidal current, since surplus electric power generated can be stored.

Next, the sixth and seventh embodiments will be explained by reference to FIGS. 7 to 11.

Figure 8:
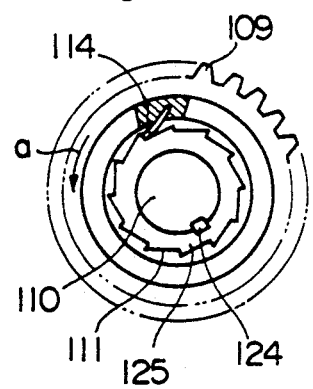
FIG. 8 is a front view of a one-way rotary device being one portion of the luminous float in accordance with the sixth embodiment.
Figure 9:
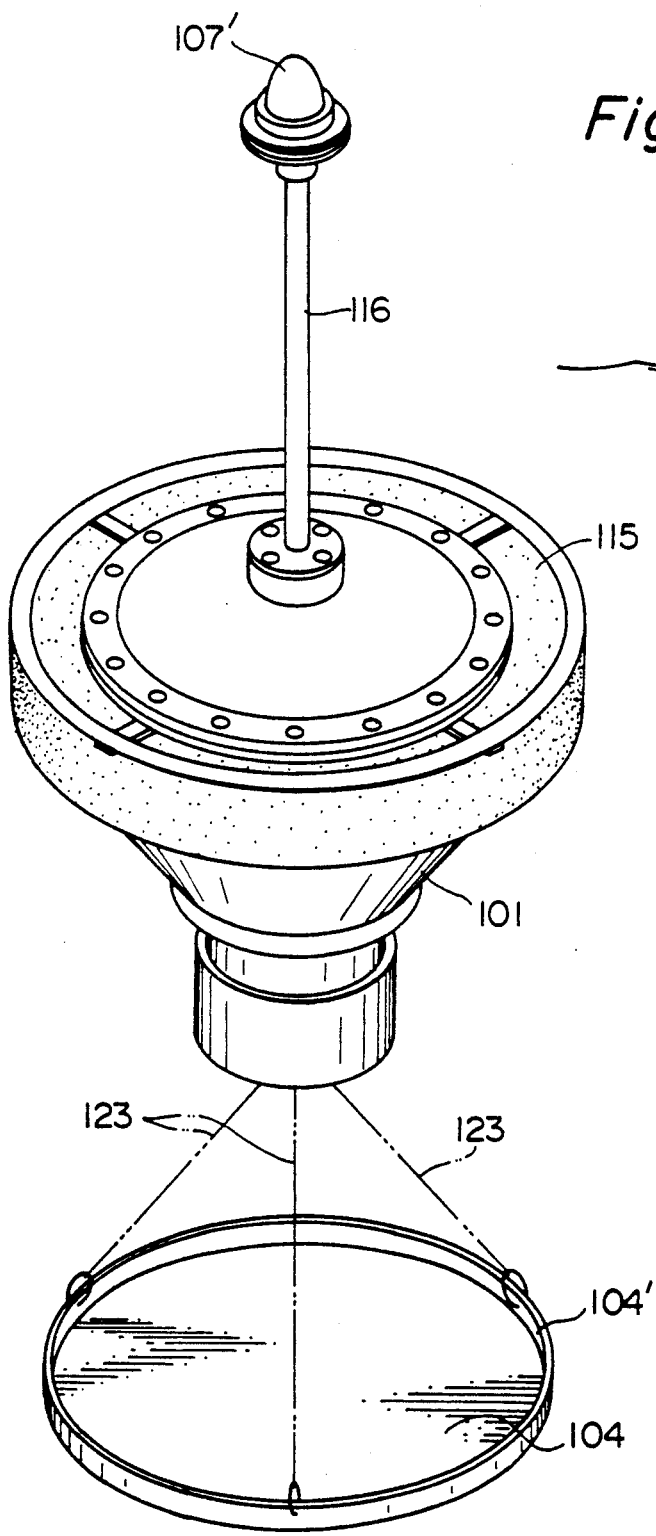
FIG. 9 is a perspective view of the luminous float in accordance with the sixth embodiment.
Figure 10:
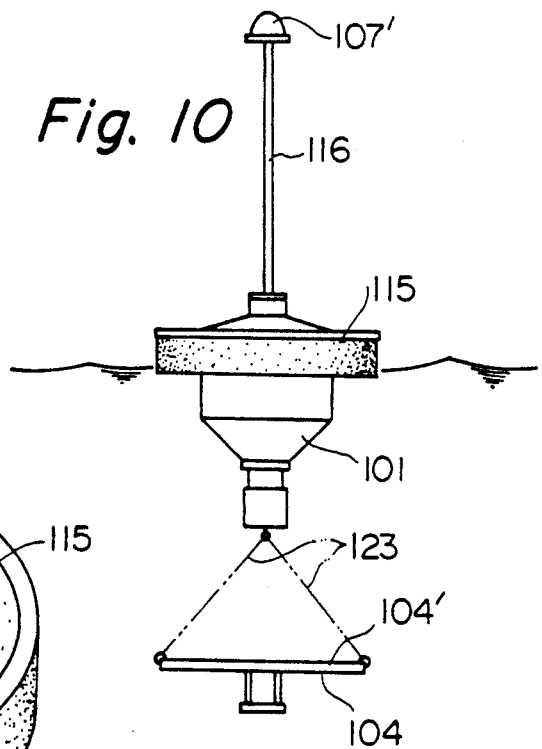
FIG. 10 is a drawing which shows the state of the luminous float according to the sixth embodiment being afloat on the sea.
Figure 11:
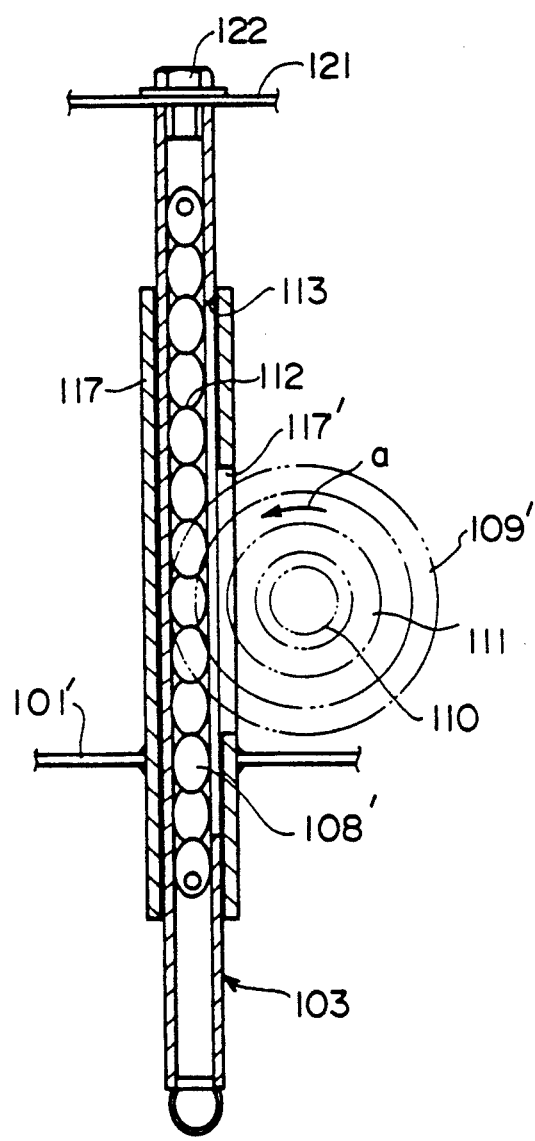
FIG. 11 is a front view of a chain rack being one portion of a luminous float in accordance with the seventh embodiment.

In the sixth embodiment, on an upper periphery of a hollow float body 101 there is provided a styrene-foamed circular floating body 115. An electric lamp 107 is attached to an upper end of a pole 116 provided on a central portion of an upper surface of the float body 101, and a light-transmissible cover 107' is provided over the electric lamp 107. On a bottom plate 101' is provided an upright guide cylinder 117 into which a spindle 103 capable of ascending and descending is slidably fitted. A lower end of the cylinder 117 is extending downward from the bottom plate 101'. A lower periphery of the cylinder 17 is connected with a lower periphery of the above spindle 103 through a watertight bellows 118 so that water cannot come in between the above guide cylinder 117 and the spindle 103. A frame 119 is mounted on the above bottom plate 101' and spring-supporting rods 120, 120 are provided so as to stand on top of the frame 119. Upper ends of springs 102, 102 disposed on the peripheries of the supporting rods 120, 120 are attached to a horizontal rod 122 with which an upper end of the spindle 103 is connected by means of a bolt 122, so that the springs 102, 102 are compressed when the spindle 103 descends. Three chains 123, 123, 123 are suspended from a lower end of this spindle 103, and lower ends of the chains 123, 123, 123 are connected with an upward flange 104' on the periphery of a circular resistance plate 104. And a vertically long opening 117' is made in a side face of the above guide cylinder 117 so that a rack 108 formed on a side face of the spindle 103 is exposed and caused to engage with a pinion 109 through the long opening 117'. Furthermore, as in the seventh embodiment shown in FIG. 11, it is possible to form a chain rack 108' by making the spindle 103 hollow, providing a chain 112 inside, and then making a long opening 113 in the side face of the spindle 103, and to cause the chain rack 108' to engage with a sprocket 109'. Such a pinion 109 and sprocket 109' are pivotally supported on a rotating shaft 110 for driving a dynamo 105 mounted on the frame 119. A one-way rotary device 111 is provided between the above pinion 109 and sprocket 109', and the dynamo 105 is connected with the above electric lamp 107 through a condenser 106. If the above one-way rotary device comprises, as shown in FIG. 8, a ratchet toothed wheel 125 provided on the rotating shaft 110 through the aid of a key 124, and a one-way pawl 114 which engages with the toothed wheel and which is provided on the pinion 109 and sprocket 109', that is quite satisfactory, but a one-way clutch will suffice. Incidentally, if the spindle 103 has an ascending-and-descending stroke of 100 mm, the rotation angles of the pinion 109 and the sprocket 109' can be set at 180°. Reference numeral 126 in the drawings indicates a wiring code.

With the above structure, an upward motion of waves pushes up the float body 101 and the resistance plate 104 puts up resistance thereto so that the spindle 103 descends against the force of the springs 102, relative to the float 1. Whereupon the pinion 109 or the sprocket 109' rotates in one direction (indicated with the arrow a), and at the same time, the rotating shaft 110 rotates in the same direction due to the one-way pawl 114 to drive the dynamo 105 for electricity generation; consequently, the condenser 106 is charged with electricity. With a downward motion of waves, the float body 101 starts to move downward. Since the resistance plate 104 is prevented from descending by the water resistance, the spindle 103 ascends relative to the float body 101 and this ascent is assisted by the force of the springs 102. And at the time of this ascent, the pinion 109 or the sprocket 109' takes the play on the rotating shaft 110, which does not rotate so that the dynamo 105 is not actuated. Because of this free play of the pinion 109, the springs 102 quickly return to their original length for preparation of the next electricity generation. The above operation is repeated with an up-and-down motion of waves and an intermittent generation of electricity is performed by the dynamo 105; thus, it is possible to always keep the electric lamp 107 lighted through the aid of the condenser 106. With the above ascending and descending motion of the spindle 103, the pinion 109 or the sprocket 109' can be directly subjected to two-way rotation by the rack 108 or the chain rack 108'. The stroke length of the above rack 108 or 108' is equal to the rotation length of a pitch circle for the pinion 109 or sprocket 109' which engages therewith; therefore, the ascending-and-descending stroke of the spindle 103 is equal to the rotation length of the pitch circle for the pinion 109 or sprocket 109' so that energy of ascent and descent is mostly converted into energy of rotation of the pinion 109 or sprocket 109'.

Since the present invention is constructed as stated above, it has the following advantage. Namely, the ascending and descending motion of the spindle 103 caused by the up-and-down motion of waves can be nearly 100% converted into a rotary motion of the pinion 109 or sprocket 109', and the dynamo 105 can be actuated with a small stroke; therefore, not only the above electric lamp 107 can be lighted on the sea even in the event of small waves, but also the dynamo 105 can be disposed in the vicinity of the spindle 103 so that the motion conversion mechanism and the float 1 can be miniaturized.

According to the above sixth and seventh embodiments, the action of the one-way rotary device causes the dynamo to rotate only in one direction. Consequently, the load on the toothed wheel connected with the dynamo is lightened, whereby the toothed wheel can be prevented from being damaged, and furthermore, the coils of the dynamo can be prevented from being damaged by overheating.

Moreover, in the above embodiments, when the space between the float body and the resistance plate is broadened by wave power and tidal power and when the spring is caused to extend longer or contract shorter than the reference length, rotation of the pinion is conveyed to the rotation drive shaft of the dynamo through the aid of the one-way rotary device. When the spring returns to the reference length, the one-way rotary device causes the pinion to race so that the rotation of the pinion is not conveyed to the rotation drive shaft of the dynamo. With such a structure, once electricity is generated, the spring can quickly return to the reference length for early preparation of the next electricity generation, and the amount of electricity to be generated can be increased.

On the other hand, the following structure is also possible. That is, when the space between the float body and the resistance plate is broadened by wave power and tidal power and when the spring is caused to extend longer or contract shorter than the reference length so that energy is stored in the spring, the one-way rotary device causes the pinion to race so that the rotation of the pinion is not conveyed to the rotation drive shaft of the dynamo. And when the spring returns to the reference length, the one-way rotary device conveys the rotation of the pinion to the rotation drive shaft of the dynamo. With such a structure, a nearly constant rotation force according to elastic force of the spring is imparted to the dynamo, and the dynamo generates a nearly constant electric power for each cycle of electricity generation. Therefore, with the above structure, the dynamo can be directly connected with a lamp, without using a condenser, etc.

What is claimed is:

1. A luminous float comprising a float body; a bellows which is provided at the bottom of the float body and which is capable of contracting and extending with the inside thereof being shut off from the outside; a resistance plate; a connecting means adapted to connect the bottom of the bellows with the resistance plate; a spring of which one end is coupled to an inner member of the float body; a coupling means adapted to couple the other end of the spring to the bottom of the bellows; a dynamo having a rotation drive shaft; a motion conversion mechanism which converts reciprocation of the coupling means into a rotary motion of the rotation drive shaft of the dynamo; and a light-emitting device connected to the dynamo.

2. A luminous float comprising: a float body; a spring of which one end is coupled to an inner member of the float body; a spindle attached to the other end of the spring; a resistance plate; a connecting means adapted to connect the spindle with the resistance plate; a dynamo having a rotation drive shaft; a pinion which engages with the spindle; a one-way rotary device disposed between the pinion and the rotation drive shaft of the dynamo; and a light-emitting device connected to the output terminals of the dynamo; wherein the spindle is provided with a cylindrical body having a long opening made in a side face thereof and with a chain fixed inside the cylindrical body, said spindle being constructed such that the chain engages with a sprocket.

* * * * *